(12) United States Patent
Featherstone et al.

(10) Patent No.: US 9,903,713 B2
(45) Date of Patent: Feb. 27, 2018

(54) METHOD OF CONTROLLING A COORDINATE POSITIONING MACHINE

(71) Applicant: RENISHAW PLC, Wotton-under-Edge, Gloucestershire (GB)

(72) Inventors: Timothy C Featherstone, Edinburgh (GB); Matthew H Freeman, Cambridge (GB); Nadim Borini, West Drayton (GB)

(73) Assignee: RENISHAW PLC, Wotton-under-Edge (GB)

( * ) Notice: Subject to any disclaimer, the term of this patent is extended or adjusted under 35 U.S.C. 154(b) by 92 days.

(21) Appl. No.: 14/894,228

(22) PCT Filed: May 28, 2014

(86) PCT No.: PCT/GB2014/051612
§ 371 (c)(1),
(2) Date: Nov. 25, 2015

(87) PCT Pub. No.: WO2014/191729
PCT Pub. Date: Dec. 4, 2014

(65) Prior Publication Data
US 2016/0116276 A1  Apr. 28, 2016

(30) Foreign Application Priority Data

May 28, 2013  (GB) .................................. 1309506.2

(51) Int. Cl.
*G01B 5/008* (2006.01)
*G01B 21/04* (2006.01)
*G01B 5/012* (2006.01)

(52) U.S. Cl.
CPC ........... *G01B 21/047* (2013.01); *G01B 5/012* (2013.01)

(58) Field of Classification Search
CPC .............................. G01B 21/047; G01B 5/012
(Continued)

(56) References Cited

U.S. PATENT DOCUMENTS 5,404,649 A * 4/1995 Hajdukiewicz .......... B23Q 5/58
                                                      33/503
6,108,613 A    8/2000 Kimura et al.
(Continued)

FOREIGN PATENT DOCUMENTS

CN        1211724 A    3/1999
CN     101109629 A    1/2008
(Continued)

OTHER PUBLICATIONS

Jul. 31, 2014 Written Opinion issued in International Patent Application No. PCT/GB2014/051612.
(Continued)

*Primary Examiner* — G. Bradley Bennett
(74) *Attorney, Agent, or Firm* — Oliff PLC

(57) ABSTRACT

A method is provided of controlling a coordinate positioning machine to separate a retaining module from a releasably coupled task module, the retaining module being provided on a movable part of the machine, and the method including: moving the retaining module to place the task module into engagement with a storage port for holding the task module; and moving and simultaneously rotating the retaining module to separate the retaining module from the task module with a tilting action of the retaining module.

20 Claims, 12 Drawing Sheets

(58) Field of Classification Search
USPC .......................................................... 33/503
See application file for complete search history.

(56) References Cited

U.S. PATENT DOCUMENTS

| | | | |
|---|---|---|---|
| 6,772,527 B1 | 8/2004 | Butter et al. | |
| RE40,578 E * | 11/2008 | Trull | G01B 5/012 33/503 |
| 2005/0283990 A1* | 12/2005 | McMurtry | G01B 7/012 33/556 |
| 2008/0132393 A1 | 6/2008 | Jordil et al. | |
| 2008/0148588 A1* | 6/2008 | Yoshizumi | G01B 5/012 33/561 |
| 2009/0025243 A1* | 1/2009 | Prestidge | G01B 5/012 33/559 |
| 2009/0025244 A1* | 1/2009 | Jonas | G01B 21/045 33/559 |

FOREIGN PATENT DOCUMENTS

| | | |
|---|---|---|
| CN | 101196393 A | 6/2008 |
| CN | 101802549 A | 8/2010 |
| EP | 0360853 B1 | 1/1993 |
| EP | 0402440 B1 | 6/1995 |
| EP | 0690286 A1 | 1/1996 |
| EP | 0750171 A2 | 12/1996 |
| EP | 1989504 B1 | 11/2015 |
| WO | 93/09398 A1 | 5/1993 |
| WO | 03/083407 A1 | 10/2003 |
| WO | 2009/034341 A1 | 3/2009 |

OTHER PUBLICATIONS

Braddick, HJJ, "Mechanical Design of Laboratory Apparatus," The Institute of Physics Monographs for Students, Chapman & Hall Limited, London, (1960), pp. 7-30.
Sep. 13, 2013 Search Report issued in British Patent Application No. 1309506.2.
Jul. 31, 2014 Search Report issued in International Patent Application No. PCT/GB2014/051612.
Jul. 3, 2017 Office Action issued in Chinese Patent Application No. 201480040920.4.

* cited by examiner

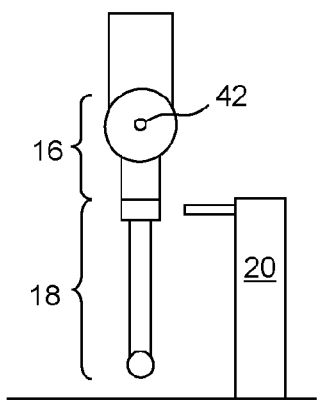
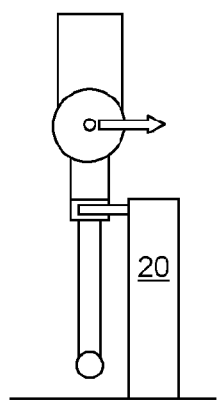
FIG. 5A     FIG. 5B
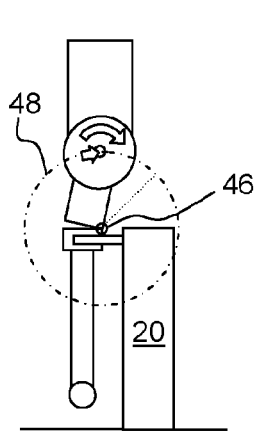
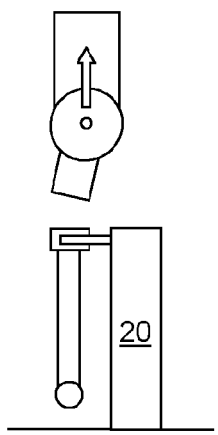
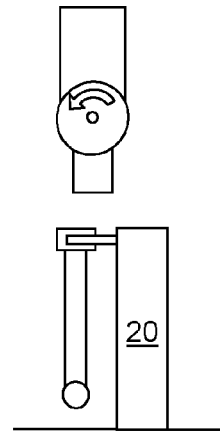
FIG. 5C     FIG. 5D     FIG. 5E

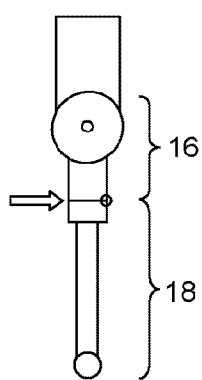 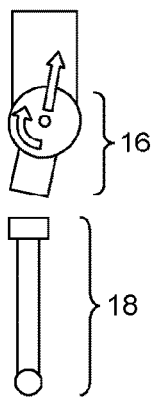 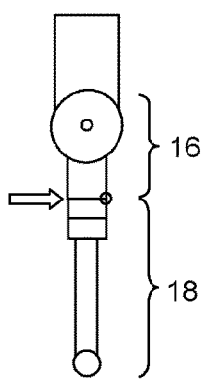 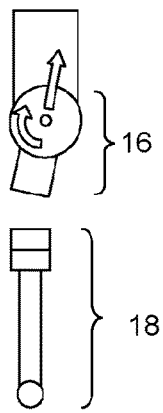
FIG. 6A    FIG. 6B    FIG. 7A    FIG. 7B
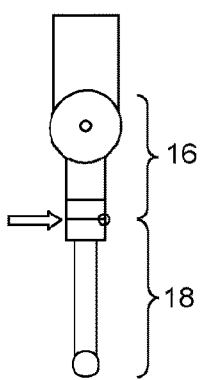 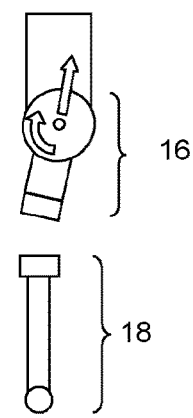 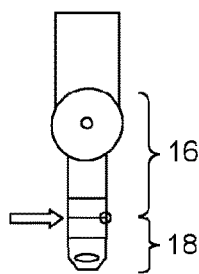 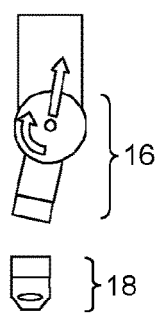
FIG. 8A    FIG. 8B    FIG. 9A    FIG. 9B

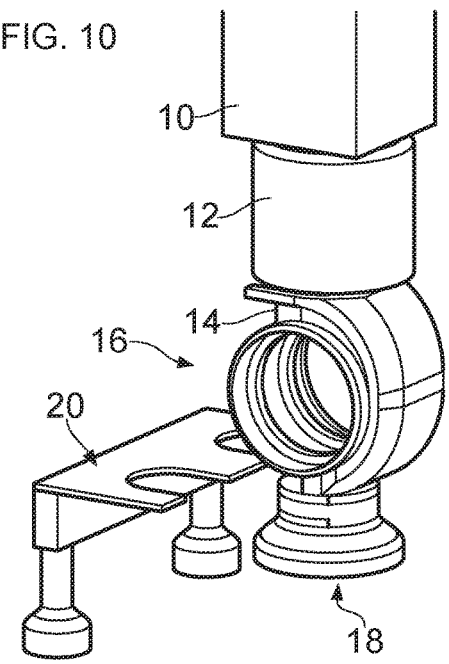
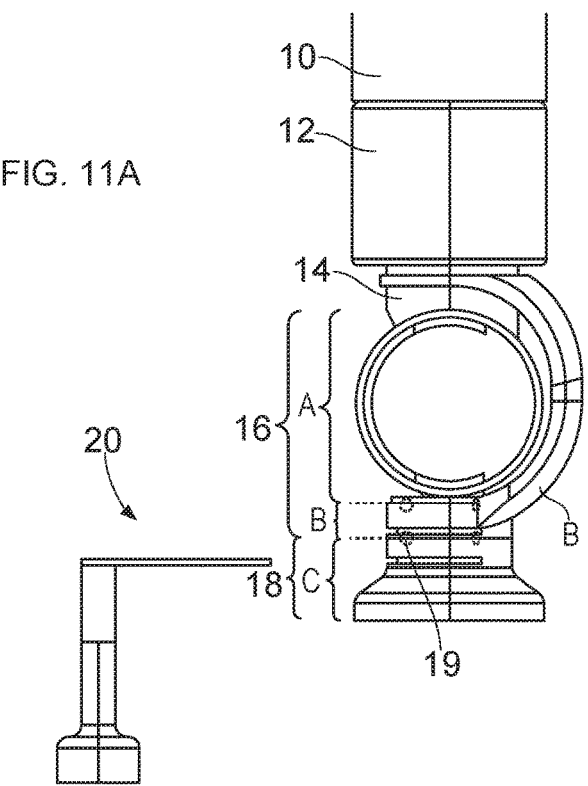
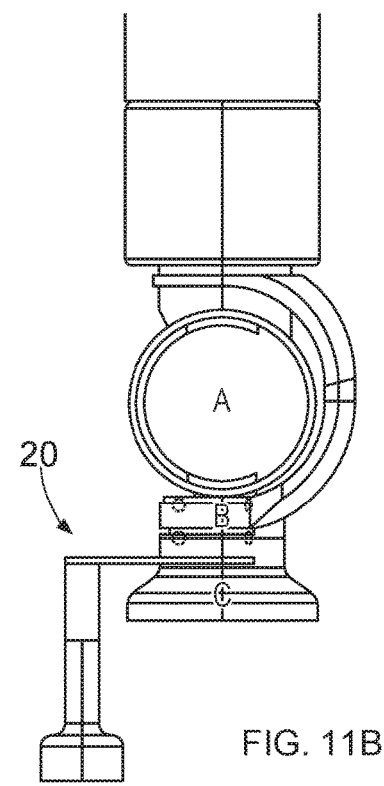

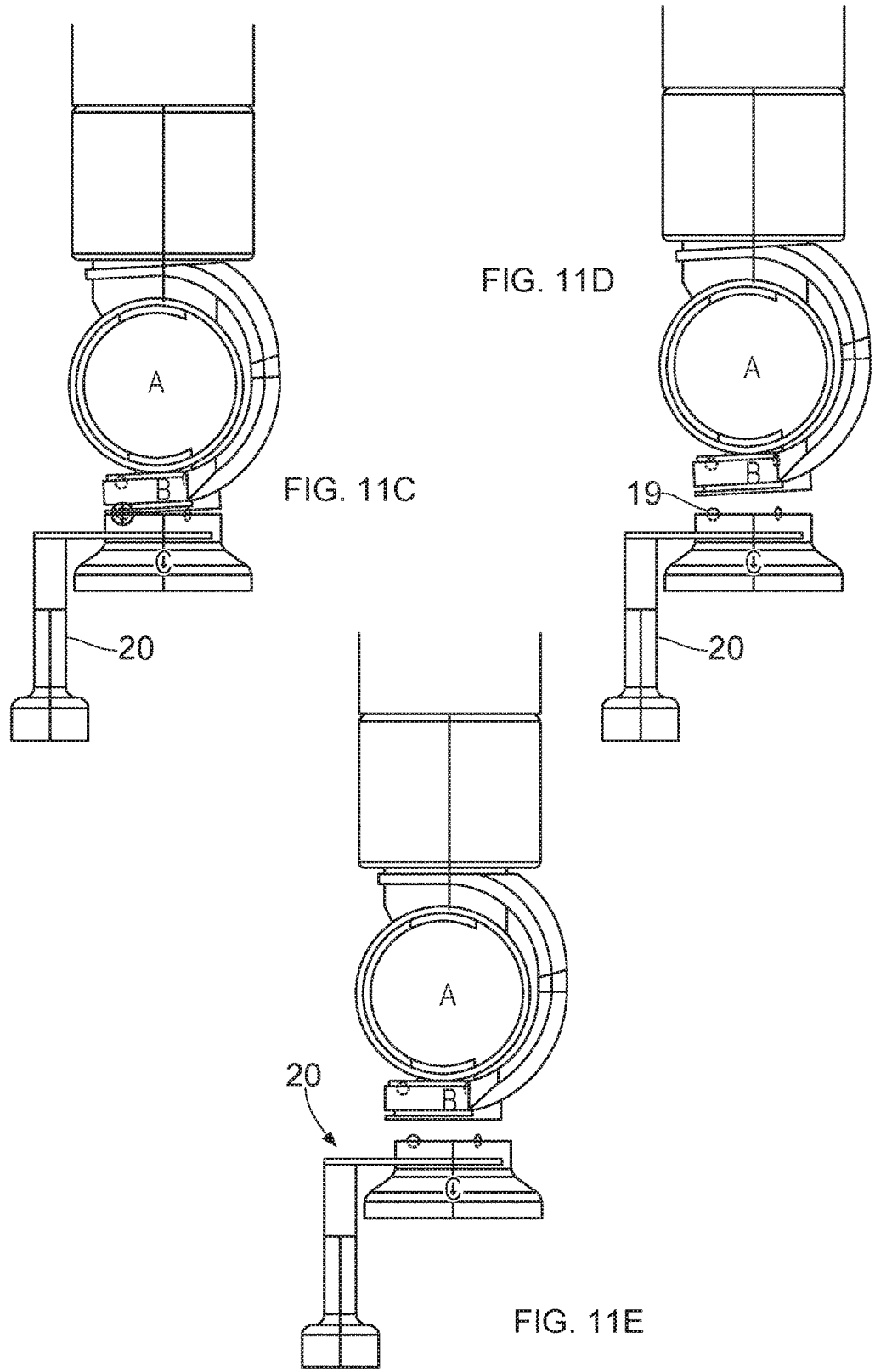

FIG. 12A
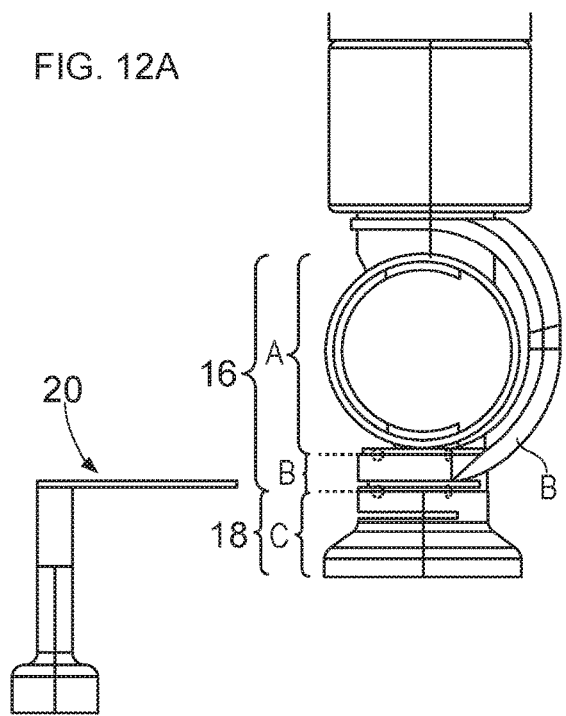
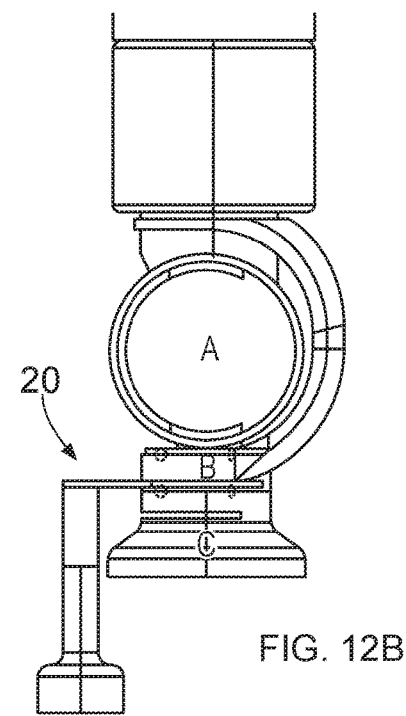
FIG. 12B
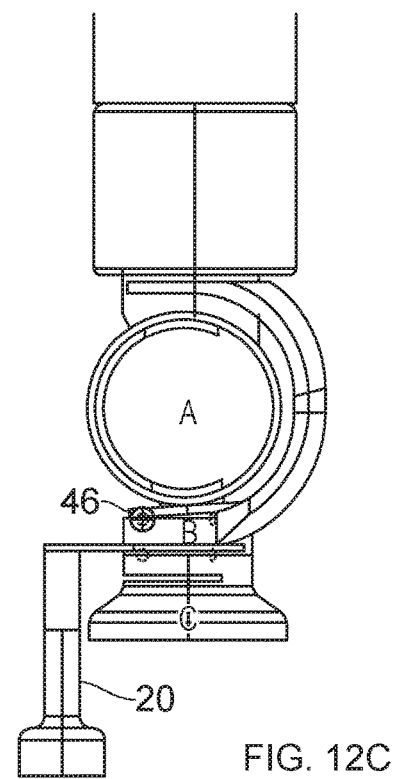
FIG. 12C
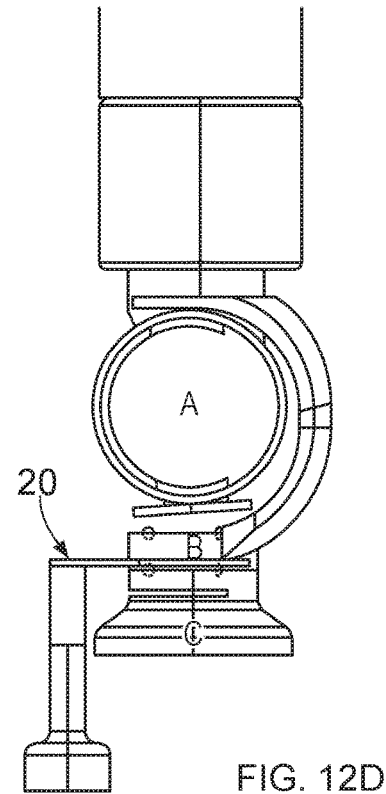
FIG. 12D

METHOD OF CONTROLLING A
// COORDINATE POSITIONING MACHINE

The present invention relates to a method of controlling a coordinate positioning machine, and in particular to a method of controlling a coordinate positioning machine to separate releasably coupled modules from one another, and to a machine or machine controller adapted to perform such a method. Coordinate positioning machines include, for example, coordinate measuring machines, machine tools and manual coordinate measuring arms.

FIG. 1 of the accompanying drawings shows a known coordinate measuring machine (CMM) 2 in which a quill (or arm) 10, mounted on a carriage 8, is movable in orthogonal linear directions x, y and z by motors (not shown) on the CMM 2. A task module 18, in this example in the form of a stylus module, is releasably mounted on a retaining module 16, with the retaining module 16 being attached to the quill 10. In this example, the retaining module 16 and the illustrated task module 18 can together be considered to constitute a probe 17. The retaining module 16 may comprise a sensing module which houses the sensing mechanism of the probe 17.

The position of the task module 18 on the retaining module 16 is typically defined by engagement between a set of kinematic elements on an upper surface of the task module 18 with a set of kinematic elements on a lower surface of the retaining module 16. These kinematic elements may comprise, for example, three cylindrical rollers spaced at 120° about the longitudinal axis of the probe 17 on one of the modules engageable with three pairs of balls similarly spaced on the other of the modules. The respective elements are held in engagement by the attraction between magnets provided on both the retaining and task modules 16, 18.

The modular construction of the probe 17 enables automatic exchange of styli and other task modules. To provide a truly flexible measuring system, a plurality of task modules may be retained within the working area of the machine 2 to enable automatic exchange of one task module for another. For this purpose, a storage port may be provided on the CMM 2 to house a task module. Several storage ports may be accommodated together in a magazine. A task module housed in a storage port may be picked up by the retaining module or a task module may be deposited into an empty storage port by the retaining module. In this manner the probe may exchange task modules so that it uses the most suitable one for the task in hand.

WO9309398 discloses the use of such a magazine accommodating a plurality of storage ports for housing exchangeable task modules. Each storage port comprises a base with a pair of jaws, the jaws having parallel docking inserts. Relating this to FIG. 1 of the accompanying drawings, the probe 17 (with retaining module 16 attached to the quill 10 and task module 18 releasably mounted on the retaining module 16) is transported by the CMM 2 to the storage port, and the task module 18 is inserted into the storage port by further operation of the CMM 2. The task module 18 has a circular lip which interfaces with the docking inserts of the storage port. The task module 18 is then separated from the retaining module 16 by an upward movement of the quill 10 which, as the task module 18 is retained by the storage port, breaks the contact between them.

Such a magazine and task modules as disclosed in WO9309398 enable engagement of a task module 18 by a retaining module 16, and disengagement of the task module 18 from the storage port in a single continuous movement and without any additional machine apparatus (such as dedicated motors or electromagnets). However, the arrangement of WO9309398 has the disadvantage that the magnetic force between the retaining module 16 and the task module 18 may be large and the force required to separate them will thus also be large. This is particularly so in the case of large probes where a large magnetic force is required in order to support a large and heavy task module 18.

That disadvantage was addressed in WO03083407, which describes an arrangement in which a mechanism is provided within the storage port for separating the task module 18 from the retaining module 16 using a mechanical advantage. With such an arrangement, a linear movement of the retaining module 16 relative to the storage port causes the mechanism in the storage port to lever the task module 18 and the retaining module 16 apart.

An arrangement as disclosed in WO03083407 is illustrated in FIGS. 2A and 2B of the accompanying drawings. A storage port 20 is illustrated, comprising a housing 22 with a pivot arm 24 located within the housing 22 and extending out from the housing 22 at one end. The pivot arm 24 is rotatable a limited amount about a pivot 26 located within the housing 22.

The part of the pivot arm 24 extending from the housing 22 has a generally U-shaped cut-out with two fingers defining opposite sides, as shown in FIG. 6 of WO03083407. These fingers of the pivot arm 24 are designed to receive the task module 18 of the probe 17. The task module 18 is provided with a pair of recesses on its outer surface into which the fingers are inserted. Alternatively it may have, for example an annular recess to receive the fingers.

The task module 18 is inserted into the storage port 20 by horizontal movement of the quill 10 and retaining module 16 on which it is secured. Once the task module 18 has been inserted into the storage port 20, as shown in FIG. 2A, the task module 18 is separated from the retaining module 16 by moving the quill 10 and the attached retaining module 16 upwards. As the task module 18 moves upwards with the retaining module 16, the end of the pivot arm 24 received by the task module 18 is also pulled upwards and rotates about its pivot 26. In doing so, it causes the task module 18 to break contact with the retaining module 16 along one edge, as shown in FIG. 2B.

As the rotating motion of the pivot arm 24 causes the retaining module 16 to break contact with one edge of the task module 18, rather than pulling the two modules apart along the longitudinal axis of the probe 17, less force is required in separating the two modules 16, 18.

The present applicant has recognised the desirability of simplifying the design of such a storage port whilst still allowing for a straightforward separation of the task module from the retaining module. The present applicant has also recognised that, where multiple task modules are coupled together magnetically in a stacked arrangement, it is hard to predict where the separation will occur using the above-described techniques, particularly where the magnetic couplings are of similar strength. The present applicant has accordingly recognised the desirability of providing a technique which works reliably with a stack of releasably coupled task modules.

According to a first aspect of the present invention, there is provided a method of controlling a coordinate positioning machine to separate a retaining module from a releasably coupled task module, the retaining module being provided on a movable part of the machine, and the method comprising: moving the retaining module to place the task module into engagement with a storage port for holding the task module; and moving and simultaneously rotating the retaining module to separate the retaining module from the task module with a tilting action of the retaining module.

The retaining module may comprise a plurality of individual modules releasably coupled to one another. The plurality of individual modules may be releasably coupled to one another in series.

The task module may comprise a plurality of individual modules releasably coupled to one another. The plurality of individual modules may be releasably coupled to one another in series.

The method may comprise controlling the simultaneous movement and rotation so as to maintain a resulting axis of rotation for the retaining module sufficiently close to the coupling interface between the retaining module and the task module (or sufficiently close to a plane in which the coupling interface lies) to ensure that a separation occurs at that coupling interface in preference to a coupling interface between any two other releasably coupled modules within the retaining module or the task module.

The method may comprise controlling the simultaneous movement and rotation such that a resulting axis of rotation for the retaining module remains closer to a coupling interface between the retaining module and the task module (or a plane in which the coupling interface lies) than it does to a coupling interface (or a plane in which the coupling interface lies) between any two other releasably coupled modules within the retaining module or the task module.

The method may comprise controlling the simultaneous movement and rotation such that a resulting axis of rotation for the retaining module remains substantially at or along a coupling interface between the retaining module and the task module (or at or along or just offset from a plane in which the coupling interface lies).

The axis of rotation may be controlled to remain substantially at or near an edge of the coupling interface between the retaining module and the task module. Alternatively, the axis of rotation may be controlled to remain substantially at a position offset from the edge of the coupling interface.

The coupling interface between the retaining module and the task module may comprise a plurality of alignment features for alignment of the task module with respect to the retaining module when releasably coupled.

The method may comprise controlling the simultaneous movement and rotation such that a resulting axis of rotation for the retaining module passes substantially through a first one of the alignment features, thereby pivoting the retaining module about the first alignment feature.

The method may comprise controlling the simultaneous movement and rotation of the retaining module such that the axis of rotation passes substantially through first and second ones of the alignment features, thereby pivoting the retaining module about the first and second alignment features.

At least one of the alignment features may be a kinematic feature. All of the alignment features may be kinematic features. The alignment features may form a kinematic coupling between the retaining module and the task module.

During the simultaneous movement and rotation of the retaining module, the movement may be along a path that lies substantially in a plane, while the simultaneous rotation may be about an axis substantially orthogonal to the plane. The plane may be substantially orthogonal to a coupling interface between the task module and the retaining module.

The task module may be held substantially stationary in the storage port during the simultaneous movement and rotation of the retaining module.

During the simultaneous movement and rotation of the retaining module, the movement may be along a part-circular path.

According to a second aspect of the present invention, there is provided a coordinate positioning machine controller configured to perform a method according to the first aspect of the present invention. In other words, the coordinate positioning machine controller is configured to perform a method of controlling a coordinate positioning machine to separate a retaining module from a releasably coupled task module, the retaining module being provided on a movable part of the machine, and the method comprising: moving the retaining module to place the task module into engagement with a storage port for holding the task module; and moving and simultaneously rotating the retaining module to separate the retaining module from the task module with a tilting action of the retaining module.

According to a third aspect of the present invention, there is provided a coordinate positioning machine comprising a controller according to the second aspect of the present invention. In other words, the coordinate positioning machine comprises a coordinate positioning machine controller configured to perform a method of controlling the coordinate positioning machine to separate a retaining module from a releasably coupled task module, the retaining module being provided on a movable part of the machine, and the method comprising: moving the retaining module to place the task module into engagement with a storage port for holding the task module; and moving and simultaneously rotating the retaining module to separate the retaining module from the task module with a tilting action of the retaining module.

According to a third aspect of the present invention, there is provided a computer program which, when run by a coordinate positioning machine controller, causes the controller to perform a method according to the first aspect of the present invention, or which, when loaded into a coordinate positioning machine controller, causes the coordinate positioning machine controller to become a coordinate positioning machine controller according to the second aspect of the present invention. The program may be carried on a carrier medium. The carrier medium may be a storage medium. The carrier medium may be a transmission medium.

According to a fourth aspect of the present invention, there is provided a computer-readable medium having stored therein computer program instructions for controlling a coordinate positioning machine controller to perform a method according to the first aspect of the present invention.

The computer program is (or the computer program instructions are) configured to control a coordinate positioning machine to separate a retaining module from a releasably coupled task module, the retaining module being provided on a movable part of the machine, with the computer program (or the computer program instructions) being configured to: move the retaining module to place the task module into engagement with a storage port for holding the task module; and move and simultaneously rotate the retaining module to separate the retaining module from the task module with a tilting action of the retaining module.

According to another aspect of the present invention, there is provided a method of controlling a coordinate positioning machine to separate a retaining module from a releasably coupled task module, the retaining module being provided on a movable part of the machine, and the method comprising: moving the retaining module to place the task module into engagement with a storage port for holding the task module; and moving and simultaneously rotating the task module to separate the retaining module from the task module with a tilting action of the task module.

The coordinate positioning machine may be a machine tool, an inspection robot, a computer numerical control (CNC) machine, or a coordinate measuring machine.

Reference will now be made, by way of example, to the accompanying drawings, in which:

FIG. 1, discussed hereinbefore, is a perspective view of a coordinate measuring machine carrying a probe;

FIGS. 2A and 2B, also discussed hereinbefore, are schematic views of the probe positioned in a previously-disclosed storage port;

FIGS. 5A to 5E illustrate steps in a method of controlling a coordinate measuring machine according to an embodiment of the present invention;

FIGS. 6A and 6B illustrate one possible arrangement of the retaining module and the task module;

FIGS. 7A and 7B illustrate another possible arrangement of the retaining module and the task module;

FIGS. 8A and 8B illustrate another possible arrangement of the retaining module and the task module;

FIGS. 9A and 9B illustrate another possible arrangement of the retaining module and the task module;

FIG. 10 is a perspective view of another application of the present invention;

FIGS. 11A to 11E illustrate steps in a method according to an embodiment of the present invention of controlling the FIG. 10 apparatus;

FIGS. 12A to 12F illustrate steps in another method according to an embodiment of the present invention of controlling the FIG. 10 apparatus;

An embodiment of the present invention will now be described. This embodiment of the present invention makes use of an articulating head of the type used on coordinate positioning machines, such as coordinate measurement machines (CMMs) and the like.

Articulating probe heads are known and have been described previously in, for example, EP360853, EP402440, EP690286 and EP1989504. A typical articulating probe head comprises a base that is attachable to the moveable arm or quill of a coordinate positioning machine such as a machine tool or coordinate measuring machine (CMM). The articulating probe head is arranged to support a measurement probe with one or more degrees of rotational freedom relative to the moveable arm or quill of the coordinate positioning machine. Such an arrangement has a number of advantages; for example, it allows differently oriented surfaces to be inspected by the measurement probe thereby allowing the probing of features on parts that would otherwise be inaccessible.

Figure 1:
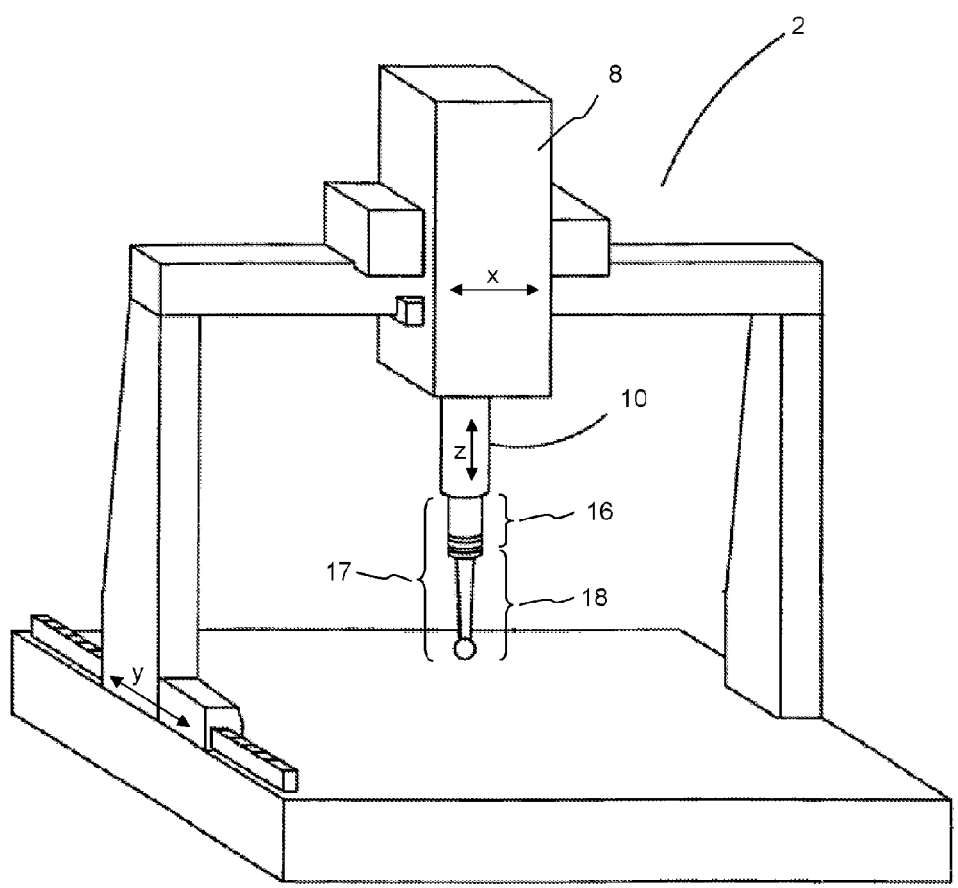
Figure 2A:
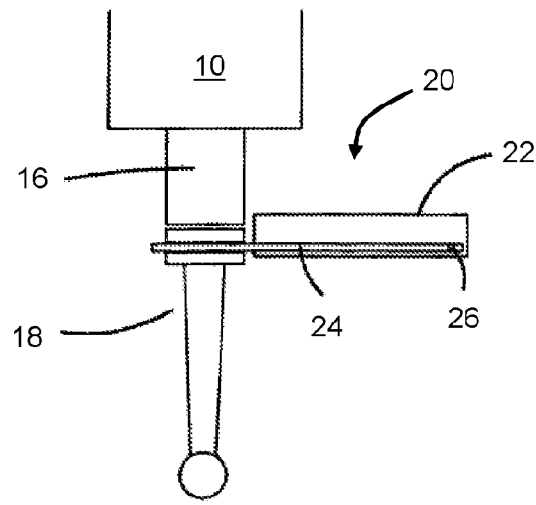
Figure 2B:
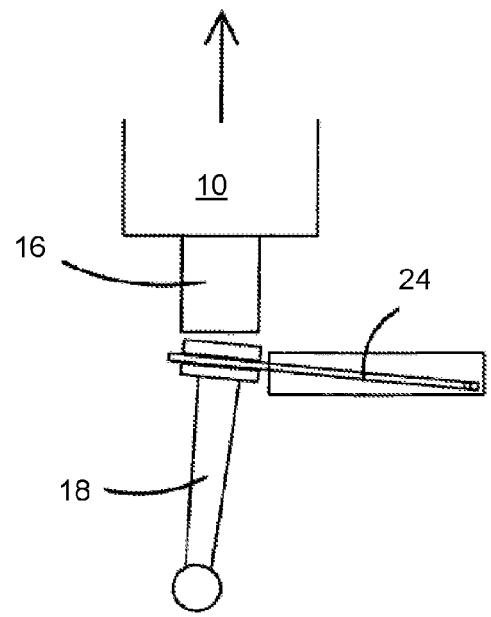
Figure 3:
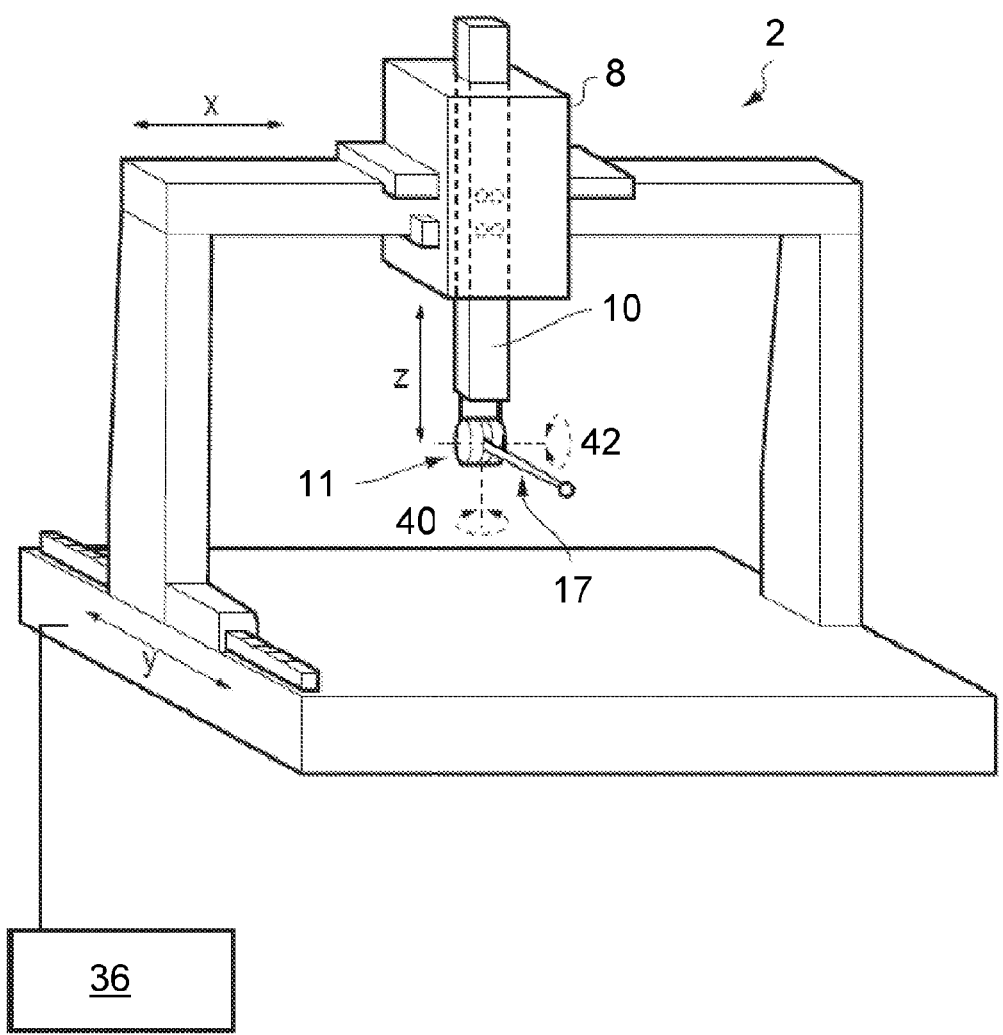
FIG. 3 is a perspective view of a coordinate measuring machine, corresponding to that shown in FIG. 1, including an articulating head for carrying the probe.

A CMM 2 incorporating such an articulating head 11 is illustrated in FIG. 3. The articulating head 11 supports the probe 17, with the articulating head 11 providing first and second axes of rotation 42 and 40, as will be described in more detail below. A machine controller 36 for controlling the operation of the CMM 2 is also illustrated. With a modular system of the type described with reference to FIGS. 1 and 2, the articulating head can of course be used to support task modules other than measurement probes.

Figure 4:
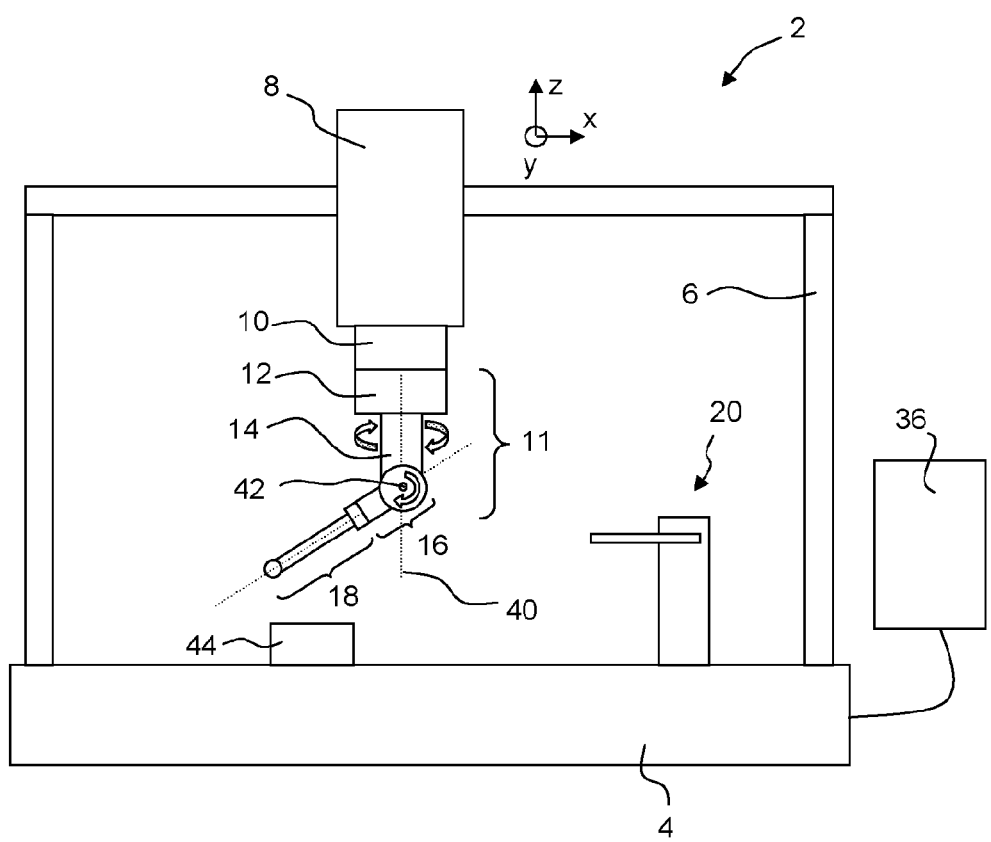
FIG. 4 is a schematic side view of a coordinate measuring machine according to an embodiment of the present invention.

Parts of a coordinate measuring machine (CMM) 2 having an articulating head are illustrated in more detail in FIG. 4. The CMM 2 comprises a base 4 supporting a frame 6 which in turn holds a carriage 8, in which a quill 10 is moveable with respect to the carriage 8 in a z direction. Just as for the FIG. 1 machine, motors (not shown) are provided to move the quill 8 along the three mutually orthogonal axes x, y and z.

The quill 10 holds an articulating probe head 11. The articulating probe head 11 has a base portion 12 attached to the quill 10, an intermediate portion 14 and a retaining module 16. The base portion 12 comprises a first motor (not shown) for rotating the intermediate portion 14 about a first rotational axis 40. The intermediate portion 14 comprises a second motor (not shown) for rotating the retaining module 16 about a second rotational axis 42 that is substantially perpendicular to the first rotational axis 40. Although not shown, bearings may also be provided between the moveable parts of the articulating probe head 11. A storage port 20 is provided within the working area of the CMM 2

A task module 18, in this example in the form of a measurement probe, is releasably coupled (e.g. using magnetic attraction as described above) to the retaining module 16. The task module 18 (measurement probe) may be a touch trigger probe or an analogue probe including a stylus. The task module 18 (measurement probe) may comprise an optical sensor. Alternatively, the task module 18 (measurement probe) may be a non-contacting probe such as an optical probe.

A machine controller 36 for controlling the operation of the CMM 2 is also provided. The machine controller 36 may be a dedicated electronic control system and/or may comprise a computer operating under control of a computer program. For example, the machine controller 36 may comprise a real-time controller to provide low-level instructions to the CMM 2, and a PC to operate the real-time controller.

The articulating probe head 11 is a so-called "active head" and, in use, the probe head 11 allows the task module 18 (measurement probe) to be moved with two rotational degrees of freedom relative to the quill 10. The combination of the two rotational degrees of freedom provided by the probe head 11 and the three linear (x, y, z) axes of translation of the quill 10 allows the task module 18 (measurement probe) to be moved about five axes. This permits so-called "five-axis" measurements of an associated part 44 mounted to the base portion 4 of the CMM 2. The machine controller 36 is arranged to provide appropriate drive currents to the first and second motors of the probe head 11 and to the motors controlling linear movement of the quill 10 along the three orthogonal linear axes x, y, z.

It should be noted that FIG. 4, and the brief description thereof above, merely provides an overview of a CMM comprising an active head, and of the active head itself. A more complete description of such apparatus can be found elsewhere; for example, see EP402440 or any of the other similar documents mentioned above.

FIGS. 5A to 5E illustrate schematically a series of stages in a method according to an embodiment of the present invention of controlling the CMM 2 to separate the retaining module 16 from the task module 18 releasably coupled thereto. The retaining module 16 is provided on (coupled to)

a movable part (the quill 10) of the CMM 2. In this example the retaining module 16 is in the form of a rotatable joint of an articulating head, with the retaining module 16 being coupled to the quill 10 via a coupling that is rotatable about axis 40 (see FIG. 4), but this need not be the case; the coupling between the retaining module 16 and the quill 10 may in another example be a fixed coupling.

FIG. 5A illustrates the retaining module 16 and the releasably coupled task module 18 alongside the storage port 20 within the working area of the CMM 2. The interface between the task module 18 and the retaining module 16 is referred to herein as a coupling interface. Where the respective housings of the task module 18 and the retaining module 16 are substantially cylindrical, the coupling interface will be generally circular in shape. As described further below, the coupling interface may be provided with alignment features (such as kinematic features) to align the task module 18 accurately and repeatably with respect to the retaining module 16, but this is not necessarily the case.

In the next stage, as illustrated in FIG. 5B, the machine controller 36 controls the CMM 2 to move the retaining module 16 along a path in x, y, z that places the task module 18 into engagement with the storage port 20. As mentioned above, the storage port 20 is adapted to hold the task module 18. In this example, the storage port 20 is shown as including an arm which extends from a body of the storage port 20; the extending arm may have a generally U-shaped cut-out or fork with two fingers defining opposite sides. The fingers of the arm are designed to receive and hold the task module 18, with the task module 18 being provided with a pair of recesses on its outer surface into which the fingers are inserted. Other ways of holding the task module 18 within the storage port 20 will readily be apparent to the skilled person.

Although it is depicted in FIGS. 5A and 5B that the retaining module 16 is moved along a purely horizontal path so as to place the task module 18 into engagement with the storage port 20, it will be appreciated that in general the machine controller 36 can be arranged to move the retaining module 16 along any type of path in x, y, z that is required to place the task module 18 into engagement with the storage port 20; indeed, where necessary the movement may include rotation of the retaining module 16 and the releasably-coupled task module 18 around one or more rotational axes of the articulating head 11 of the CMM 2 (see the description above with reference to FIG. 4), so as to orient the task module 18 correctly for insertion into the storage port 20.

As illustrated in FIG. 5C, with the task module 18 being held substantially stationary by the storage port 20, the machine controller 36 then controls the CMM 2 (which includes the articulating head 11) to move the retaining module 16 in x, y, z and simultaneously to rotate the retaining module 16 about the axis 42. This simultaneous movement and rotation of the retaining module 16 is coordinated such that the retaining module 16 pivots about an edge of the coupling interface between the retaining module 16 and the task module 18. The simultaneous movement and rotation of the retaining module 16 defines an axis of rotation 46 of the retaining module 16, which is controlled so as to remain substantially stationary at the edge of the coupling interface.

In this example, the movement in x, y, z lies substantially in a plane, with the simultaneous rotation being performed about an axis substantially orthogonal to that plane. The plane is substantially orthogonal to the coupling interface between the task module 18 and the retaining module 16. The plane could, for example, be the y, z plane, or could be the x, z plane, but it will be appreciated that the orientation of the plane is dictated by the particular position and orientation of the storage port 20 and the desired orientation of the axis of rotation 46. As illustrated in FIG. 5C, the path in x, y, z is part-circular, being an arc of a circle 48 that is centred on the axis of rotation 46 with a radius defined by the separation between the axis 42 and the axis 46.

As illustrated in FIG. 5D, the machine controller 36 then controls the CMM 2 to move the retaining module 16 upwards, away from the storage port 20. As illustrated in FIG. 5E, the machine controller 36 then controls the CMM 2 to rotate the retaining module 16 about the axis 42 in an opposite sense to the rotation in FIG. 5C so as to return the retaining module 16 to its original orientation.

By these steps, the retaining module 16 is caused to separate from the task module 18 with a tilting action of the retaining module 16. This differentiates the present invention from the previously-considered technique disclosed in FIG. 2, and has a number of advantages over that technique.

Firstly, using a technique embodying the present invention, the storage port 20 is much simpler (and less costly). The storage port 20 does not require any complicated pivoting arrangement, or any other type of mechanism to tilt a part of the storage port itself. With an embodiment of the present invention, the storage port 20 can be of simple design, for example formed entirely of fixed parts, and does not require a specially designed rack port with tilting mechanism.

Secondly, articulating heads that are already in widespread use can be used to effect the present invention, since they provide a convenient means by which the retaining module 16 can be rotated to separate the retaining module 16 from the task module 18 with a tilting action of the retaining module 16. All that is required is for the machine controller 36 to be configured appropriately to perform the necessary actions, using only the range of motion available in the servo axes.

It is described above that the movement and rotation of the retaining module 16 in the stage illustrated in FIG. 5C is simultaneous. This is to be understood as covering control of the retaining module 16 in which the movement and rotation occur in an interleaved fashion, with small rotations of the retaining module 16 being alternated in very quick succession with small movements of the retaining module 16, with the overall result being that there is effectively simultaneous movement and rotation of the retaining module 16. This can alternatively be expressed as a combined movement and rotation of the retaining module 16.

It will also be understood that, in the context of the stage illustrated in FIG. 5C, where it is described that there is a simultaneous movement and rotation of the retaining module 16, the "movement" element of this can be considered and described as being a translation of the retaining module 16. This can therefore alternatively be expressed as a simultaneous (or combined) translation and rotation of retaining module 16.

In the example described with reference to FIG. 5C, the simultaneous movement and rotation of the retaining module 16 is controlled so as to define an axis of rotation 46 which remains substantially stationary at the edge of the coupling interface. However, it will be appreciated that the axis of rotation 46 need not be placed at the edge of the coupling interface, or even within the bounds of the coupling interface, but could instead be offset from the edge of the coupling interface, outside the bounds of the coupling interface but still on or near (e.g. offset a small distance from) a plane in which the coupling interface lies.

In the examples described thus far, with reference to FIGS. 4 and 5A to 5E, the retaining module 16 and the task module 18 are not themselves formed of separable modules (or sub-modules). The invention is also applicable to a scenario in which the retaining module 16 comprises a plurality of individual modules releasably coupled to one another in series. The invention is also applicable to a scenario in which the task module 18 comprises a plurality of individual modules releasably coupled to one another in series. A combination of these is also possible, where both the retaining module 16 and the task module 18 are formed of a plurality of releasably-coupled modules. This will be described in more detail with reference to FIGS. 6 to 9.

FIGS. 6A and 6B illustrate again the scenario already described with reference to FIG. 5, with the retaining module 16 comprising just a single module (the rotatable joint of the articulating head 11), and the task module 18 also comprising just a single module (the measurement probe). The machine controller 36 knows that there is only one coupling interface at which the coupling between the two modules 16, 18 can be broken (or separated), and this coupling interface is illustrated by the arrow in FIG. 6A. The machine controller 36 also knows the axis of rotation 46 for the retaining module 16 lies at or near an edge of the coupling interface, and is able to control the simultaneous movement and rotation of the retaining module 16 accordingly, as illustrated in FIG. 6B, to separate the retaining module 16 from the task module 18 with a tilting action of the retaining module 16. FIG. 6B also illustrates that the movements illustrated in FIGS. 5C and 5D can be combined into a single continuous movement, without requiring two distinct and separate stages as illustrated in FIGS. 5C and 5D. Indeed, one or more other stages (e.g. all the stages) can be performed in a fluid, continuous manner without any clear distinction between them; for example, the separate stages as illustrated in FIGS. 5D and 5E can easily be combined into a single, fluid movement of the retaining module 16.

An alternative scenario is illustrated in FIGS. 7A and 7B. In this scenario, the retaining module 16 still comprises a single module (the rotatable joint). However, the task module 18 now comprises two modules releasably coupled to one another: the measurement probe and an additional module (which may also be some form of task module, such as a processing module) above the measurement probe. The task module 18 is now releasably coupled to the retaining module 16 by way of a releasable coupling between the addition module and the retaining module 16. The coupling interface at which the coupling between the retaining module 16 and task module 18 is to be broken is illustrated by the arrow in FIG. 7A, and the axis of rotation for the retaining module is also marked. As before, the machine controller 36 controls the simultaneous movement and rotation of the retaining module 16 to separate the retaining module 16 from the task module 18 with a tilting action of the retaining module 16, as illustrated in FIG. 7B.

It will be appreciated that the additional module introduced in FIG. 7 could also be considered to be part of the retaining module 16, rather than the task module 18. Whether a module is considered as part of the retaining module 16 or the task module 18 depends on the position of the coupling interface at which the coupling between the retaining module 16 and task module 18 is to be broken.

For example, FIG. 8 illustrates the same number and order of modules as FIG. 7, but in FIG. 8 the coupling interface at which the coupling is to be broken is different to FIG. 7. As in FIG. 7, in FIG. 8 there are three modules releasably coupled to one another in series. If these are labelled as first to third modules, starting with the upper module (which is the rotatable joint), and ending with the lower module (the measurement probe), then in FIG. 7 the coupling interface at which the coupling is to be broken is between the first and second modules, while in FIG. 8 it is between the second and third modules (as illustrated again by the arrow). Therefore, in FIG. 7, the second and third modules form the task module 18, with the retaining module 16 being the first module alone; while in FIG. 8 the first and second modules form the retaining module 16, with the task module 18 being the third module alone.

Another scenario is illustrated in FIG. 9, this time with first to fourth modules, and with the coupling interface at which the coupling is to be broken being between the second and third modules. The first and second modules therefore form the retaining module 16 and the second and third modules form the task module 18. Of course, a different allocation is possible, and this allocation can be determined during use depending on where the stack of modules is to be broken. FIG. 9 also illustrates that the present invention is not limited to having a task module incorporating a measurement probe; in FIG. 9 the fourth module is a lens module.

The principle of operation is the same in all four scenarios illustrated in FIGS. 6 to 9 respectively: the machine controller 36 controls the simultaneous movement and rotation of the retaining module 16 (however constituted) to separate the retaining module 16 from the task module 18 (however constituted) with a tilting action of the retaining module 16.

As mentioned above, the various modules are preferably coupled to one another using a kinematic coupling. As will be understood by the skilled person, and as for instance described in H. J. J. Braddick, "Mechanical Design of Laboratory Apparatus", Chapman & Hall, London, 1960, pages 11 to 30, kinematic design involves constraining the degrees of freedom of motion of a body or feature using the minimum number of constraints and in particular involves avoiding over constraining. The use of a kinematic coupling ensures highly repeatable positioning of one module with another module, and means that the modules will be coupled in a predictable and known manner. Accordingly, kinematic features provided on one module of a pair engage with corresponding kinematic features on the other module of the pair. It is to be understood that, to avoid any degree of over constraint whatsoever, a kinematic coupling would in theory require point contacts between the coupled parts. However, the generally accepted meaning of a kinematic coupling is one that conforms generally with kinematic design principles, even if small area contacts are used instead of point contacts. Such a kinematic coupling could be referred to as pseudo or quasi kinematic. Kinematic constraint is also sometimes referred to as exact constraint.

Whilst the examples illustrated in FIGS. 4 to 9 can incorporate kinematic coupling features, these are not explicitly shown. An example will now be described with reference to FIG. 10 (and associated FIGS. 11 and 12) which does explicitly include kinematic coupling features. Also, whilst FIGS. 4 to 9 are rather schematic in nature, FIG. 10 illustrates a more realistic application of the present invention.

Since like reference numerals illustrate like parts, and since the example of FIG. 10 is closely related to the examples of FIGS. 4 to 9, a detailed description of the parts in FIG. 10 is not required. In brief, FIG. 10 is a perspective view of a task module 18, held by retaining module 16, alongside a storage port 20 in which the task module 18 is to be placed; the storage port 20 illustrated in FIG. 10 is a two-port change rack.

A side view of FIG. 10 is illustrated in FIG. 11A, showing the various parts more clearly. FIG. 11A is also the first stage in a series of stages illustrated respectively in FIGS. 11A to 11E, corresponding closely to the stages illustrated in FIGS. 5A to 5E as described above. It can be seen from FIG. 11A that there are three modules A, B and C releasably coupled to one another in series.

In the example sequence illustrated in FIGS. 11A to 11E it is the intention to break the coupling between modules B and C, and it can therefore be considered that modules A and B form the retaining module 16, while module C is the task module. In reality, of course, module B is also a "task module" in the sense that it is adapted and provided to perform a certain useful task, and not merely to act to hold or support another module below it.

In the particular example illustrated in FIG. 11A, module B is a camera module, and module C is a lens module; module A is again just the rotating (or rotatable) pivot joint of an articulating head. As can be seen from FIG. 11A, the camera module B has a part which extends around rotating module A; the upper end of the extending part of module B (which acts as a counterweight) is not fixedly attached as will become apparent below with reference to FIG. 12F.

Also illustrated in FIG. 11A are kinematic coupling features 19. These are in the form of balls provided on one of two coupled modules which sit within slots or grooves provided in the coupling surface of the other of the two coupled modules. The skilled person will readily appreciate how to implement such a kinematic coupling.

As mentioned above, FIG. 11A is the first stage in a series of stages illustrated respectively in FIGS. 11A to 11E, and these stages correspond closely to the stages illustrated in FIGS. 5A to 5E respectively. In the particular application concerned, FIG. 11A illustrates the start of a lens module change cycle: the slot on the lens module C is lined up in the plane of the forks of the change port 20.

In FIG. 11B, the machine controller 36 controls the CMM 2 so that the slot in the lens module C engages fully with the forks of the change port 20.

In FIG. 11C, the machine controller 36 controls the CMM 2 (including the articulating head) to perform a five-axis motion (or at least using three of the five axes: at least two Cartesian axes of the quill 10 and one rotational axis of the articulating head) which resolves to a rotation about a rotational axis 46 coincident with one of the kinematic mounts of the lens module C, the axis 46 being in a plane nominally parallel to the plane of the kinematic, and most conveniently parallel to the bottom rotary axis 42 of the articulating head. It does not matter which of the kinematic mounts provided at the coupling interface between the lens module C and the camera module B is used to define the axis 46, as long as there is sufficient clearance between the parts to allow a small rotation to break the other kinematic mounts. This example illustrates, therefore, that the rotation axis 46 need not be right at the edge of the coupling interface that is being broken, but can be within the bounds of the coupling interface, for example at a feature at the coupling interface such as a kinematic feature. As mentioned above, it is even possible that the rotation axis 46 lies outside the bounds of the coupling interface. The positioning of the rotation axis 46 will be explored in more detail below with reference to FIGS. 14 and 15. It is also to be noted that although FIG. 11C illustrates an anticlockwise rotation of the articulating head to pivot around the left side, it is also possible to perform a clockwise rotation in this step, so as to pivot about the opposite side, for example with the rotational axis 46 being coincident with two kinematic mounts of the lens module C.

In FIG. 11D, the machine controller 36 controls the CMM 2 to perform a substantially vertical move to break the remaining kinematic seating (or seatings), and in FIG. 11E the articulating head performs a rotary move to return the camera module B to a straight-down position.

Of course, as explained with reference to FIGS. 6 to 9, the modules A to C can be broken or separated at a different coupling interface. FIGS. 12A to 12E illustrate an alternative sequence of stages to FIGS. 11A to 11E in which the modules are separated at the coupling interface between the rotating module A and the camera module B, so that the task module 18 is made up of camera module B and lens module C, and the retaining module 18 is just the rotating module A.

Figures 12E, 12F:
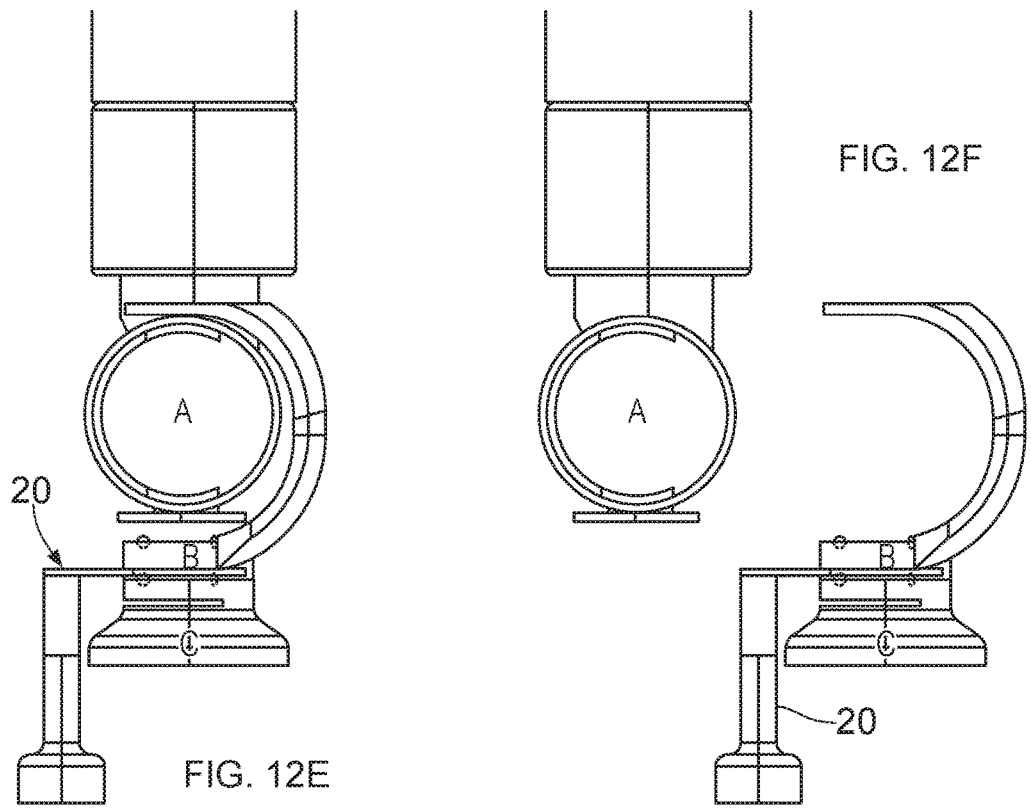
Figure 13:
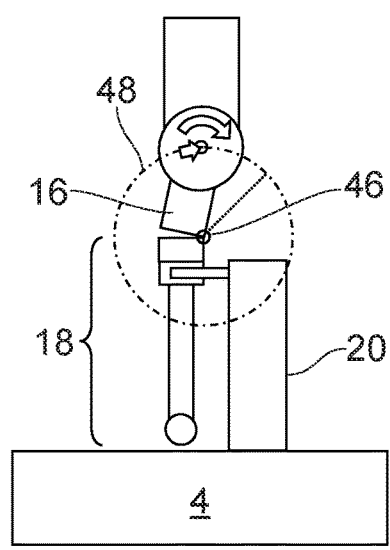
FIG. 13 illustrates a scenario in which the task module is held in the storage port at a module other than the uppermost module making up the task module.

Therefore, in brief, FIG. 12A illustrates the start of a camera module change cycle: the slot on the camera module B is lined up in the plane of the forks of the change port 20. In FIG. 12B, the slot in the camera module B is made to engage with the forks of the change port 20. In FIG. 12C, an effective rotation is made about an axis 46 coincident with one of the kinematic mounts 19 of the camera module B; again it does not matter which of the kinematic mounts between the lens module C and camera module B is chosen to position the axis 46, as long as there is sufficient clearance between the parts to allow a small rotation to break the other kinematic mounts. In FIG. 12D, a substantially vertical move is made to break the remaining kinematic seating. In FIG. 12E a rotary move is made to return the mount to a straight-down position. An additional stage is illustrated in FIG. 12F, in which the machine controller 36 controls the CMM 2 to perform a substantially horizontal move to bring the articulating head clear of the counterweights of the camera module B.

Where the task module 18 is made up of more than one module, although it would typically be the case that the uppermost of those modules is held in the storage port 20 whilst the retaining module 16 is rotated, this need not necessarily be the case. Indeed, this may be impossible in some situations. For example, FIG. 13 is a schematic illustration corresponding to FIG. 7, in which there are two modules making up the task module 18. In FIG. 13, because of the length of the lower of the two modules (measurement probe) in relation to the height of the arm of the storage port 20 above the base 4, it is not possible to hold the upper of the two modules in the storage port 20. It could also be that the upper of the two modules is not suitably adapted to be held by the storage port 20. However, it is still possible to hold the lower of these two modules in the storage port 20 whilst ensuring that the axis of rotation 46 of the retaining module 16 is appropriately positioned relative to the coupling interface between the retaining module 16 and the upper module of the task module 18 (for example, as described above, at or near the edge of the coupling interface, or offset from the edge of the coupling interface but still on or near a plane in which the coupling interface lies, or closer to the coupling interface to be broken than any other coupling interface). This will ensure that the stack of modules is separated at the correct coupling interface.

It is described above that the simultaneous movement and rotation of the retaining module 16 is controlled such that a resulting axis of rotation for the retaining module 16 remains at or near an edge of a coupling interface between the retaining module 16 and the task module 18. It is also described that this is effective even where there are multiples modules releasably coupled to one another in a stack: for example, if the axis of rotation 46 is placed at or near the coupling interface at which it is desired to break or separate the stack, then the stack will indeed be separated at that interface rather than an adjacent interface. In short, the stack of modules is separated based on the positioning of the axis of rotation 46. One possible mechanical analysis of why this works, i.e. why the stack of modules separates based on the positioning of the axis of rotation 46, will now be explored with reference to FIGS. 14 and 15.

Figure 14:
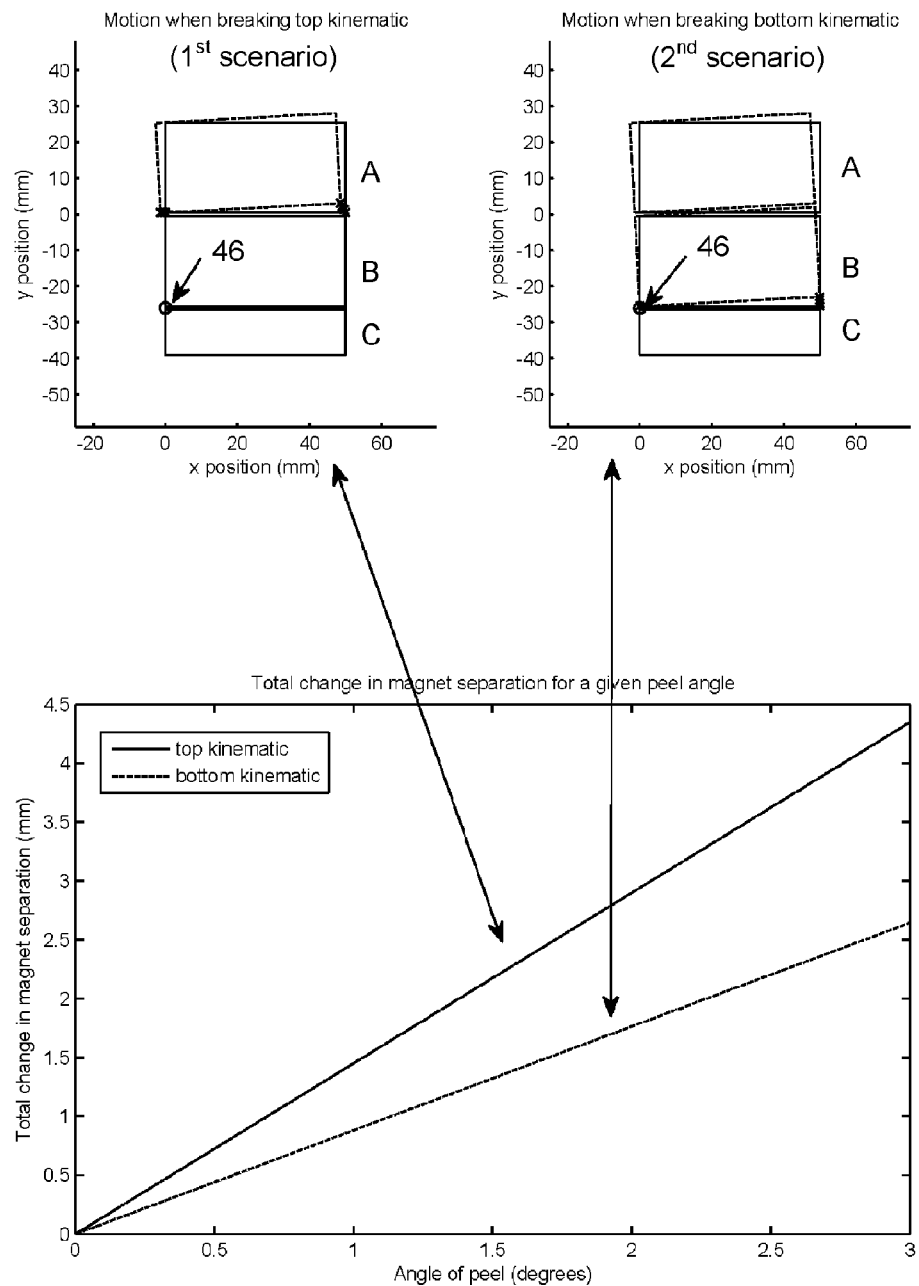
FIGS. 14 and 15 present a mechanical analysis of why a stack of modules separates as intended based on the positioning of the axis of rotation.

Consider two identical modules A and B releasably coupled to one another and to a fixed support module C below, with identical magnetic coupling forces and identical coupling features (in this illustration, kinematic features) at the respective coupling interfaces. FIG. 14 presents an analysis of the situation where the rotation axis 46 is placed on one of the kinematic features of the lower coupling interface (i.e. between modules B and C). This is akin to the situation described above with reference to FIG. 8.

Two graphs are plotted in the lower part of FIG. 14, corresponding to two alternative scenarios: a first in which the stack of modules is thereby caused to separate at the upper coupling interface (i.e. between modules A and B), and a second in which the stack of modules is thereby caused to separate at the lower coupling interface (i.e. between modules B and C). The first scenario is depicted in the upper left part of FIG. 14, while the second scenario is depicted in the upper right part of FIG. 14.

For each of these scenarios, a line is plotted in the lower part of FIG. 14 to show the total change in magnet separation against peel angle (i.e. the angle that is opened up between the two modules). It can be seen that, for a given peel angle, the magnet separation required in the first scenario is greater than for the second scenario (the gradient for splitting the upper kinematic is steeper). This means that more work is required to split the upper kinematic, so the bottom kinematic will split instead (less work required): i.e. the second scenario will happen in practice.

Figure 15:
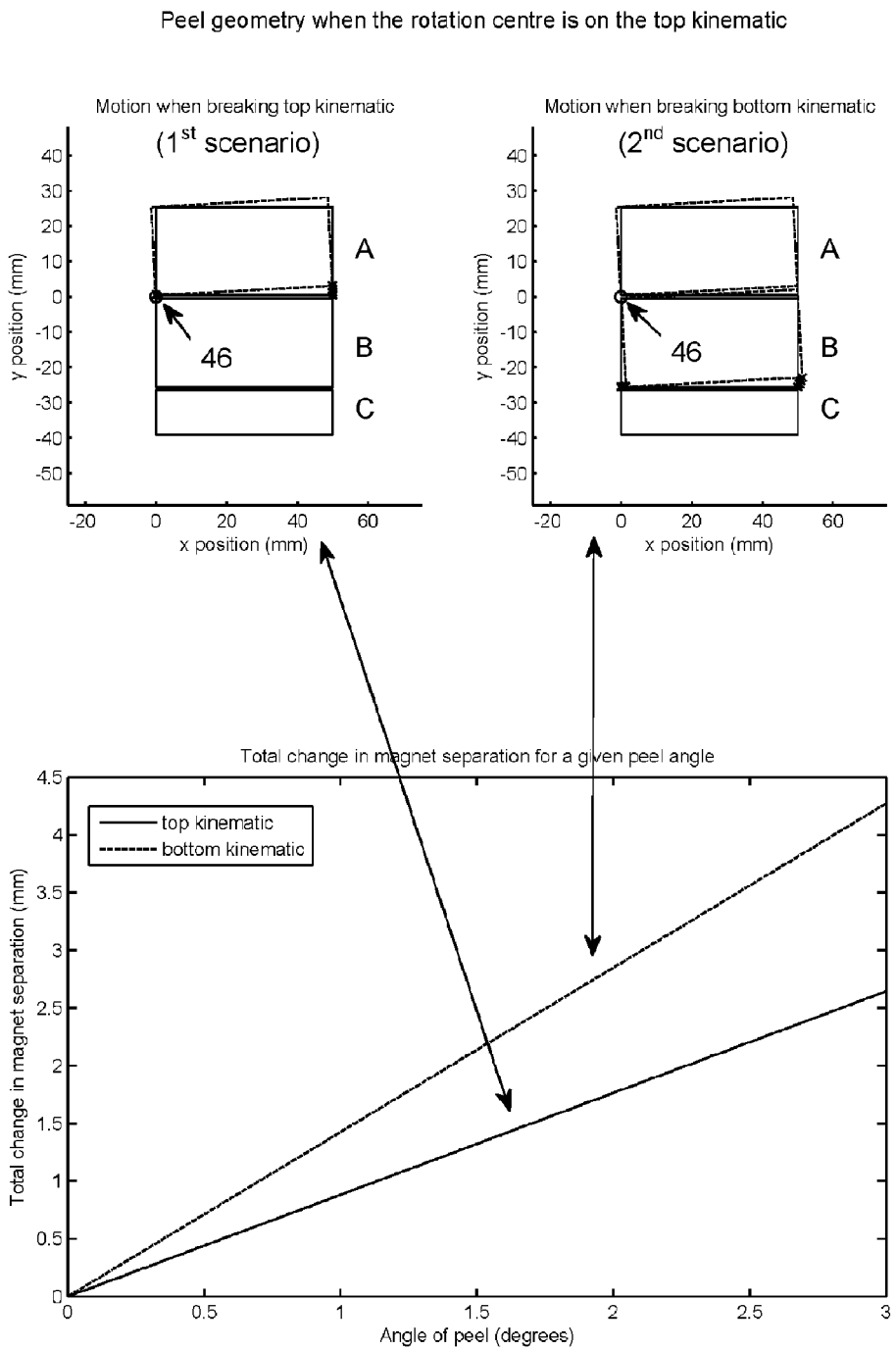

FIG. 15 presents an analysis of the situation where the rotation axis 46 is instead controlled so as to be placed on one of the kinematic features of the upper coupling interface (i.e. between modules A and B). This is akin to the situation described above with reference to FIG. 13.

Two graphs are plotted in the lower part of FIG. 15, corresponding to two alternative scenarios: a first in which the stack of modules is thereby caused to separate at the upper coupling interface (i.e. between modules A and B), and a second in which the stack of modules is thereby caused to separate at the lower coupling interface (i.e. between modules B and C). The first scenario is depicted in the upper left part of FIG. 15, while the second scenario is depicted in the upper right part of FIG. 15.

For each of these scenarios, a line is plotted in the lower part of FIG. 15 to show the total change in magnet separation against peel angle (i.e. the angle that is opened up between the two modules). It can be seen that, for a given peel angle, the magnet separation required in the second scenario is greater than for the first scenario (the gradient for splitting the upper kinematic is steeper). This means that more work is required to split the lower kinematic, so the upper kinematic will split instead (less work required): i.e. the first scenario will happen in practice.

One can extend the above reasoning to show that, at least for a stack of identical modules, the break will occur at the coupling interface nearest the chosen pivot point (rotation axis 46). Therefore, there is not a requirement to maintain the rotation axis 46 precisely at the chosen coupling interface, but rather it should be maintained closer to that coupling interface than any other. In other words, the machine controller 36 can be set up to control the simultaneous movement and rotation of the retaining module 16 such that the resulting axis of rotation 46 for the retaining module 16 remains closer to a coupling interface between the retaining module 16 and the task module 18 than it does to a coupling interface between any two other releasably coupled modules within the retaining module 16 or the task module 18.

This guidance can be modified appropriately where there are differing coupling forces and/or differing coupling features between modules. More generally, it can be said that the simultaneous movement and rotation of the retaining module 16 is controlled so as to maintain the resulting axis of rotation for the retaining module 16 sufficiently close to the coupling interface between the retaining module 16 and the task module 18 to ensure that a separation occurs at that coupling interface in preference to a coupling interface between any two other releasably coupled modules within the retaining module 16 or the task module 18.

It will also be appreciated that it may not be possible to control the movement and rotation of the retaining module 16 with absolute precision, so that even if—for example—the intention is that the axis of rotation 46 remains stationary, it may not do so in practice. From the above explanation, it will be apparent that this does not matter, since the technique is reasonably tolerant of such imperfections. In some instances, the simultaneous movement and rotation could intentionally be controlled such the axis of rotation 46 does not remain stationary, and is for example made to follow a predetermined path.

It will be appreciated that the analysis presented with reference to FIGS. 14 and 15 is not intended to be rigorous or complete, but is merely intended to offer one possible explanation and to act as guidance. Other factors are also likely to be at play, depending on the particular setup being deployed. For example, in addition to comparing magnet separation (and hence work done) to determine which joint will break first, it could be that a greater force is required to break a kinematic in a lateral (sliding) direction rather than an axial (lifting) direction. For example, referring to the diagram in the upper left part of FIG. 14, a break at the upper joint (between modules A and B) would require the left-hand kinematic to slide (rather than lift) off, which is mechanically difficult to achieve because of the nature of the coupling.

It will be appreciated that, instead of moving and simultaneously rotating the retaining module 16 as described above to separate the retaining module 16 from the task module 18 with a tilting action of the retaining module 16, an active storage port 20 could be provided which enables a similar active tilting action instead to be performed on the task module 18. Accordingly, a method is also proposed of controlling a coordinate positioning machine to separate the retaining module 16 from the releasably coupled task module 18 in which: the retaining module is moved to place the task module 18 into engagement with the storage port 20 for holding the task module 18; and the task module 18 is moved and simultaneously rotated by the storage port 20, whilst holding the retaining module 16 substantially stationary, to separate the retaining module 16 from the task module 18 with a tilting action of the task module 18. The active storage port 20 in such an example would be controlled by the machine controller 36. This is to be differentiated from the previously-considered technique described above with reference to FIG. 2, in which a passive storage port 20 is used, and furthermore in which the retaining module 16 is required to be moved upwards to cause the tilting action of the task module 18. Actively moving/rotating the task module 18 in this manner has a particular advantage over the previously-considered technique in a situation where there is more than one module making up the retaining module 16 and/or the task module 18, because the movement/rotation of the task module 18 can be done in a controlled manner so as to ensure that the correct coupling is broken. It is also possible to combine actively moving/rotating the retaining module 16 with actively moving/rotating the task module 18 to separate the retaining module 16 from the task module 18 with a tilting action of both the task module 18 and the retaining module 16.

An advantage achieved by the present invention is that there is a sequential or phased breaking of the forces that couple the retaining module to the task module, rather than having to break the entire force at once, as for example is the case with WO9309398. For example, where a coupling interface has three kinematic alignment features, and where the retaining module is made to pivot about two of the three kinematics, the coupling is first broken at the remaining kinematic (during the rotating stage), and then broken at the two pivoting kinematics (during the lifting stage). Where the retaining module is made to pivot about one of the three kinematics, the coupling is first broken first at the remaining two kinematics (during the rotating stage), and then broken at the pivoting kinematic (during the lifting stage). This is akin to peeling one layer from another layer, where the coupling force between layers is not broken over the entire area at once, but sequentially across the area. Where two theoretically rigid planar surfaces are pivoted or tilted with respect to one another, although in theory the entire surface areas will move apart from one another at the same time (except potentially at the rotation axis), in practice there may be some degree of flexibility in the surfaces and/or the coupling structures so that there is a degree of sequential decoupling as with peeling, with the coupling being broken in sequence, starting further away from the rotation axis and moving towards the rotation axis. In addition, because of the tilting action, different parts of the surface will be at different separations at any one time, and will therefore typically experience different coupling forces because of the nature of the coupling forces and/or coupling structures (e.g. magnetic force depends on separation), and there will be a phased or sequential decoupling of one module from the other because of that. This helps to avoid any large peak in the force required to separate the modules, with the coupling forces in an embodiment of the invention being broken sequentially or in a phased manner, rather than simultaneously, thereby helping to avoid putting strain on the machine motors and helping to avoid any sudden, violent separation, as would be the case with WO9309398.

It will be appreciated that operation of the coordinate measuring machine 2 can be controlled by a program operating on the machine 2, and in particular by program operating on a coordinate measuring machine controller such as the controller 36 illustrated schematically in FIG. 4. Such a program can be stored on a computer-readable medium, or could, for example, be embodied in a signal such as a downloadable data signal provided from an Internet website. The appended claims are to be interpreted as covering a program by itself, or as a record on a carrier, or as a signal, or in any other form.

Although an embodiment of the invention has been described mainly in the context of a coordinate measuring machine, the invention is applicable more generally to any type of coordinate positioning machine. A coordinate positioning machine can be, for example, a machine tool, inspection robot, computer numerical control (CNC) machine, or coordinate measuring machine. A coordinate measuring machine is therefore just one example of a coordinate positioning machine. Coordinate positioning machines typically include a table for supporting an object upon which the machine is operating, and an arm movable relative to the table, typically with three linear degrees of freedom, which carries a task module such as a cutting tool, an inspection probe, or a welding arm, for example. Conventional coordinate positioning machines support the movable arm either, in the case of a robot, by a plurality of serially mounted rotatable joints, or, in the case of a machine tool and coordinate measuring machine, on a plurality of serially mounted linear guideways.

The invention claimed is:

1. A method of controlling a coordinate positioning machine to separate a retaining module from a releasably coupled task module, the retaining module being provided on a movable part of the machine, and the method comprising:

moving the retaining module to place the task module into engagement with a storage port for holding the task module; and moving and simultaneously rotating the retaining module to separate the retaining module from the task module with a tilting action of the retaining module.

2. A method as claimed in claim 1, wherein the retaining module comprises a plurality of individual modules releasably coupled to one another in series.

3. A method as claimed in claim 1, wherein the task module comprises a plurality of individual modules releasably coupled to one another in series.

4. A method as claimed in claim 1, comprising controlling the simultaneous movement and rotation so as to maintain a resulting axis of rotation for the retaining module sufficiently close to the coupling interface between the retaining module and the task module to ensure that a separation occurs at that coupling interface in preference to a coupling interface between any two other releasably coupled modules within the retaining module or the task module.

5. A method as claimed in claim 1, comprising controlling the simultaneous movement and rotation such that a resulting axis of rotation for the retaining module remains closer to a coupling interface between the retaining module and the task module than it does to a coupling interface between any two other releasably coupled modules within the retaining module or the task module.

6. A method as claimed in claim 1, comprising controlling the simultaneous movement and rotation such that a resulting axis of rotation for the retaining module remains substantially at or along a coupling interface between the retaining module and the task module, or remains substantially at or along or just offset from a plane in which that coupling interface lies.

7. A method as claimed in claim 6, wherein the axis of rotation is controlled to remain substantially at or near an edge of the coupling interface between the retaining module and the task module.

8. A method as claimed in claim 6, wherein the axis of rotation is controlled to remain substantially at a position which is offset from an edge of the coupling interface between the retaining module and the task module.

9. A method as claimed in claim 1, wherein the coupling interface between the retaining module and the task module comprises a plurality of alignment features for alignment of the task module with respect to the retaining module when releasably coupled.

10. A method as claimed in claim 9, comprising controlling the simultaneous movement and rotation such that a resulting axis of rotation for the retaining module passes substantially through a first one of the alignment features, thereby pivoting the retaining module about the first alignment feature.

11. A method as claimed in claim 10, comprising controlling the simultaneous movement and rotation of the retaining module such that the axis of rotation passes substantially through first and second ones of the alignment features, thereby pivoting the retaining module about the first and second alignment features.

12. A method as claimed in claim 9, wherein the alignment features form a kinematic coupling between the retaining module and the task module.

13. A method as claimed in claim 1, wherein, during the simultaneous movement and rotation of the retaining module, the movement is along a path that lies substantially in a plane, while the simultaneous rotation is about an axis substantially orthogonal to the plane.

14. A method as claimed in claim 13, wherein the plane is substantially orthogonal to a coupling interface between the task module and the retaining module.

15. A method as claimed in claim 1, wherein the task module is held substantially stationary in the storage port during the simultaneous movement and rotation of the retaining module.

16. A method as claimed in claim 1, wherein, during the simultaneous movement and rotation of the retaining module, the movement is along a part-circular path.

17. A coordinate positioning machine controller configured to perform a method as claimed in claim 1.

18. A coordinate positioning machine comprising a controller as claimed in claim 17.

19. A computer program which, when run by a coordinate positioning machine controller, causes the controller to perform a method as claimed in claim 1.

20. A computer-readable medium having stored therein computer program instructions for controlling a coordinate positioning machine controller to perform a method as claimed in claim 1.

* * * * *